(12) United States Patent
Gershenfeld et al.

(10) Patent No.: US 8,035,414 B2
(45) Date of Patent: Oct. 11, 2011

(54) ASYNCHRONOUS LOGIC AUTOMATA

(75) Inventors: Neil Gershenfeld, Somerville, MA (US); Kailiang Chen, Cambridge, MA (US); David Allen Dalrymple, Columbia, MD (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 12/422,979

(22) Filed: Apr. 13, 2009

(65) Prior Publication Data
US 2010/0102848 A1 Apr. 29, 2010

Related U.S. Application Data

(60) Provisional application No. 61/123,809, filed on Apr. 11, 2008, provisional application No. 61/123,985, filed on Apr. 11, 2008, provisional application No. 61/192,178, filed on Sep. 16, 2008.

(51) Int. Cl.
*H03K 19/173* (2006.01)
*H03K 19/177* (2006.01)
(52) U.S. Cl. .............................. 326/38; 326/39
(58) Field of Classification Search .............. 326/37–41, 326/46, 47; 716/16
See application file for complete search history.

(56) References Cited

U.S. PATENT DOCUMENTS

| | | | | |
|---|---|---|---|---|
| 4,068,214 A | * | 1/1978 | Patil | 340/14.69 |
| 4,464,726 A | * | 8/1984 | Chiang | 708/7 |
| 4,468,727 A | | 8/1984 | Carrison et al. | |
| 4,700,187 A | * | 10/1987 | Furtek | 326/39 |
| 5,105,424 A | | 4/1992 | Flaig et al. | |
| 5,140,670 A | | 8/1992 | Chua et al. | |
| 5,243,238 A | * | 9/1993 | Kean | 326/41 |
| 5,675,808 A | | 10/1997 | Gulick et al. | |
| 6,378,068 B1 | | 4/2002 | Foster et al. | |
| 6,549,658 B1 | | 4/2003 | Schweid et al. | |
| 2001/0025227 A1 | | 9/2001 | Ajiro | |
| 2007/0194807 A1 | | 8/2007 | Reblewski et al. | |
| 2007/0260805 A1 | | 11/2007 | Siemers | |
| 2008/0061823 A1 | | 3/2008 | Schmit et al. | |

OTHER PUBLICATIONS

International Search Report and Written Opinion of the International Searching Authority, PCT App. No. PCT/US2009/040407, Jul. 21, 2009.

\* cited by examiner

*Primary Examiner* — Shawki Ismail
*Assistant Examiner* — Jany Tran
(74) *Attorney, Agent, or Firm* — Norma E. Henderson

(57) ABSTRACT

A family of reconfigurable, charge-conserving asynchronous logic elements that interact with their nearest neighbors permits design and implementation of circuits that are asynchronous at the bit level, rather than at the level of functional blocks. These elements pass information by means of charge packets (tokens), rather than voltages. Each cell is self-timed, and cells that are configured as interconnect perform at propagation delay speeds, so no hardware non-local connections are needed. An asynchronous logic element comprises a set of edges for asynchronous communication with at least one neighboring cell, each edge having an input for receiving tokens from neighboring cells and an output for transferring an output charge packet to at least one neighboring cell, and circuitry configured to perform a logic operation utilizing received charge packets as inputs and to produce an output charge packet reflecting the result of the logic operation.

13 Claims, 6 Drawing Sheets

ASYNCHRONOUS LOGIC AUTOMATA

RELATED APPLICATIONS

This application claims the benefit of U.S. Provisional Application Ser. No. 61/123,809, filed Apr. 11, 2008, the entire disclosure of which is herein incorporated by reference. This application also claims the benefit of U.S. Provisional Application Ser. No. 61/123,985, filed Apr. 11, 2008, and U.S. Provisional Application Ser. No. 61/192,178, filed Sep. 16, 2008, the entire disclosures of which are herein incorporated by reference.

STATEMENT REGARDING FEDERALLY SPONSORED RESEARCH OR DEVELOPMENT

This invention was made with U.S. government support under Grant Number CCF-0122419, awarded by the National Science Foundation (NSF) and Grant Number H94003-07-2-0707, awarded by Defense Microelectronics Activity (DMEA). The government has certain rights in this invention.

FIELD OF THE TECHNOLOGY

The present invention relates to logic circuits, cellular automata, and computation models and, in particular, to asynchronous logic cellular automata.

BACKGROUND

Today's most advanced computers are used to model physical systems, such as, for example, the folding of a protein or the circulation of the global climate, but they are also physical systems themselves. The demands of high-performance computing have driven the frontiers of device physics from vacuum tubes to semiconductor heterostructures. Between these simulated and physical realities lie many layers of abstraction: materials are assembled into devices, devices into circuits, circuits into boards, boards into cases, cases into racks, and racks into systems, and, in corresponding layers of software, applications are implemented in algorithms, written in a high-level language, compiled into microcode, scheduled by an operating system, and then executed by processors.

Most computer science programming models hide the underlying physical reality of computation, and the corresponding layers of software serve to insulate programs and programmers from knowledge of the physical construction of the computer. This division of labor is now being challenged by the growing complexity of computing systems. While device performance has been improving exponentially for decades and has a firm future roadmap [Paul S. Peercy, "The Drive to Miniaturization", Nature (406), pp. 1023-26 (2000)], this has not been true for software. Rather, cost overruns, shipping delays, and bugs have been recurring features of development efforts ranging from taping out chips to delivering operating systems. Along with programmer productivity, system scaling obstacles include interconnect bottlenecks and prohibitive power requirements.

As information technologies scale down in device size and up in system complexity, their computational and physical descriptions converge as the number of information-bearing degrees of freedom becomes comparable to the number of physical ones. It is already possible to store data in atomic nuclei and to use electron bonds as logical gates [N. Gershenfeld and I. Chuang, "Bulk Spin Resonance Quantum Computation", Science (275), pp. 350-356 (1997)]. In such a computer, the information-bearing degrees of freedom are the same as the physical ones, and it is no longer feasible to account for them independently. The universe executes in linear time, independent of its size. A scalable computer architecture must similarly reflect the scaling of its contents. An explicit description of the spatial distribution, propagation, and interaction of information in a computer program offers portability across device technologies (which must satisfy the same physical laws), scalability across machine sizes (because physical dynamics are inherently parallel), and simplification of fabrication (since causality implies locality).

The performance of a computer is limited by the bandwidth and latency of the connection between where data is stored and where it is processed. Early computers were far more limited by speed and availability of processing and memory than the performance of the connections between them. Von Neumann or Harvard-style computer architectures, where for each cycle data is transmitted to and manipulated in a central processing unit, are well suited for computers built from slow and expensive processing elements (i.e. vacuum tubes) and comparatively fast and cheap communication (wires). However, faster modern building blocks (smaller transistors, improved logic families, and other emerging technologies) have outpaced the rate that data can be fetched from memory. The operating speeds of many modern computers are beyond even the relativistic limits for data to be retrieved from an arbitrary location in a single cycle. In modern computers, it can take hundreds or even thousands of cycles to fetch a piece of data. There are a wide variety of techniques that have been developed to anticipate what data will be needed and load it ahead of time (pipelining, caching, instruction reordering, branch prediction, speculative execution, etc.), but the availability and behavior of these features can vary widely from processor to processor as can their effectiveness with different program behaviors. Although the Von Neumann abstraction is a familiar model of computation, in order to write software that takes advantage of the aggressive performance possible with modern (and future) technologies, fundamentally different models of computation will be needed, as well as computer architectures that can efficiently run them.

Physics, above the atomic level, is inherently local, and computation, like every other process, relies on physics. Thus, programming models that assume non-local processes, such as data buses, random access memory, and global clocking, must be implemented at a slow enough speed to allow local interactions to simulate the non-local effects that are assumed. Since such models do not take physical locality into account, even local effects are limited to the speed of the false non-local effects, by a global clock that regulates all operations.

A second physical attribute of information is causality: there is a finite propagation velocity. The length of the wires in a computer introduces a distance and hence time scale to its operation. This is manifestly violated in the Parallel Random Access Machine (PRAM) model for parallel computing [R. M. Karp, M. Luby, F. Meyer auf der Heide, "Efficient PRAM Simulation on a Distributed Memory Machine", Algorithmica (16), pp. 517-542 (1996)], which assumes instantaneous access from any processor to any memory location. If instead the only interconnect is between neighboring cells, then the information velocity is on the order of the gate propagation delay over the gate size, which can be picoseconds per micron [M. Sokolich, A. R. Kramer, Y. K. Boegeman, and R. R. Martinez, "Demonstration of Sub-5 ps CML Ring Oscillator Gate Delay with Reduced Parasitic AlInAs/InGaAs HBT", IEEE Electron Device Letters (22), pp. 309-311 (2001)]. This is about 100 times slower than the speed of light, or nanoseconds to cross millimeter distances on a chip, which is comparable to the speed at which conventional chips are clocked. In return for using nearest-neighbor communication the interconnect becomes a programmable part of the computation rather than fixed wiring, and scaling is based on the cell size rather than the chip size.

In computing today, many observers agree that there is a practical physical speed limit for the venerable von Neumann model (see, e.g., Ronny Ronen, Avi Mendelson, Konrad Lai, Shih L. Lu, Fred Pollack, and John P. Shen, "Coming challenges in microarchitecture and architecture", Proceedings of the IEEE, 89(3):325-340, 2001), and that the bulk of future speed increases will derive from parallelism in some form. Chipmakers are currently working to pack as many processors as they can into one box to achieve this parallelism, but in doing so, they are moving even further from the locality that is necessary for a direct implementation as physics. At the other end of the abstraction spectrum, while sequential programming models can be generalized to use multiple parallel threads, such models are often clumsy and do not reflect the physical location of the threads relative to each other or memory.

In addition, research has long suggested that asynchronous (or "self-timed") devices consume less power and dissipate less heat than typical clocked devices [Tony Werner and Venkatesh Akella, "Asynchronous processor survey", Computer, 30(11):67-76, 1997]. However, traditional microarchitectures require significant book-keeping overhead to synchronize various functional blocks, due to the nature of their instructions, which must be executed in sequence. Most asynchronous designs to present have derived their performance benefits from clever pipelining and power distribution rather than true asynchrony—known as "globally asynchronous, locally synchronous" design—and often this is not enough to offset the overhead [D. Geer, "Is it time for clockless chips? [asynchronous processor chips]", Computer, 38(3):18-21, March 2005].

These shortcomings are accepted because of the tremendous body of existing code written in sequential fashion, which is expected to run on the latest hardware. However, by removing the assumption of backwards compatibility, there is an opportunity to create a new, disruptive programming model that is more efficient to physically implement. In particular, such a model could scale favorably to an arbitrary number of parallel elements, to larger problem sizes, and to faster, smaller process technologies. Potentially, this may have eventual impact across the computing industry, particularly in high-performance computing. In addition, it could be an enabling technology for the Singularity (see Ray Kurzweil, "The Singularity Is Near: When Humans Transcend Biology", Viking Adult, September 2005).

Information in physics is an extensive quantity. Like mass, it scales with the system size. For a computer to do the same, it must be uniform, unlike the inhomogeneous combinations of processors, memory, storage, and communications that are the norm today. For this reason, cellular architectures have long been attractive as a model for computation [J. von Neumann, "Theory of Self-Reproducing Automata", edited by A. W. Burks, Univ. of Illinois Press (Urbana, 1966)], and more recently for its implementation [M. Sipper, "The Emergence of Cellular Computing", Computer (32), pp. 18-26 (1999)]. "Cellular Automata" was originally a discrete model in which space, time, and states were discretized, and update rules were carefully designed for studying complex phenomena [Neil Gershenfeld (1999), "The Nature of Mathematical Modeling", Cambridge, UK: Cambridge University Press].

Cellular automata were found to be quite successful in modeling physical interactions governed by differential equations in a continuum limit, such as, for example, lattice gases for hydrodynamics [U.S. Pat. No. 6,760,032; U. Frisch, B. Hasslacher, and Y. Pomeau, "Lattice-Gas Automata for the Navier-Stokes Equation", Phys. Rev. Lett. (56), pp. 1505-1508 (1986)] and spin dynamics [E. Domany and W Kinzel, "Equivalence of Cellular Automata to Ising Models and Directed Percolation", Phys. Rev. Lett. (53), pp. 311-314 (1984)]. Because of this great potential of computing as a physical system, cellular automata present a practical architecture for computation [N. Margolus, "Physics-Like Models of Computation", Physica D (10), pp. 81-95 (1984)].

Relevant research in the 1970s demonstrated that universal Boolean logic could be implemented in cellular automata with one-bit states and just three local rules [R. E. Banks, "Information Processing and Transmission in Cellular Automata", Ph.D. thesis, MIT (1971)]. The Banks Boolean cellular automata has only three rules, acting in 2D on one-bit states with 4 rectangular neighbors. The simplicity in primitive functioning unit, however, led to complexity in the implementation of wires and gates. In such a system, the logic functions are distributed, requiring many cells to realize them. The generality of a cellular automata's rule table allows many other behaviors to be modeled, such as hydrodynamics or graphics. Many more variants of cellular automata models/applications [see, e.g., U.S. Pat. No. 6,910,057] and hardware implementations [see, e.g., U.S. Pat. No. 7,509,479; U.S. Pat. No. 5,243,238] have been proposed. All of these implementations are based on Boolean logic.

If the goal is just computation, then this can be implemented more compactly in "logic automata" in which every cell can contain a logic gate and store its state, locally providing the interactions needed for computational universality. Logic automata are a subset of cellular automata [N. Gershenfeld, The Nature of Mathematical Modeling, Cambridge University Press, 1999] and quantize space and time with distributed cells connected locally, each performing a basic logic operation. Logic automata are therefore scalable, universal for digital computation [R. E. Banks, Information Processing and Transmission in Cellular Automata, Ph.D. thesis, Massachusetts Institute of Technology, 1971], and reflect the nature of many complex physical and biological systems [D. A. Dalrymple, N. Gershenfeld, and K. Chen, "Asynchronous logic automata," Proceedings of AUTOMATA 2008 (14th International Workshop on Cellular Automata), pp. 313-322, June 2008; L. O. Chua, "CA belongs to CNN," invited talk at AUTOMATA 2008 (14th International Workshop on Cellular Automata), June 2008]. Logic automata form a family of computer architectures that expose a cartoon version of physics that is easy for a programmer to work with but maintains the underlying physical relationship between the size of logic elements, their computation rates, and signal travel speeds. This allows programmers to work with abstractions that will have well defined behavior for both correctness and performance, regardless of which underlying technology is used to fabricate it.

The history begins with the cellular automata of von Neumann [John von Neumann, "Theory of Self-Reproducing Automata", University of Illinois Press, 1966], designed to explore the theory of self-replicating machines in a mathematical way (though never finished). This was some time after he completed the architecture for the EDVAC project [John von Neumann, "First Draft of a Report on the EDVAC", IEEE Annals of the History of Computing, 15(4):27-75, 1993], which has come to be known as "the von Neumann architecture." Many papers since then can be found examining (mostly 2-state) cellular automata, and there are a few directions to prove simple cellular automata universality— Alvy Ray Smith's [Alvay Ray Smith, "Cellular Automata Theory", PhD thesis, Stanford University, 1970], E. Roger Banks' [Edwin Roger Banks, "Cellular Automata", Technical Report AIM-198, MIT, June 1970], and Matthew Cook's more recent Rule110 construction [Matthew Cook, "Universality in elementary cellular automata", Complex Systems, 15(1), 2004]. However, while interesting from the point of view of computability theory, classical cellular automata clearly over-constrain algorithms to beyond the point of practicality, except in a small class of problems related to physical simulation (for instance, see Uriel Frisch, Dominique d'Humieres, Brasl Hasslacher, Pierre Lallemand, Yves Pomeau, and Jean-Pierre Rivet, "Lattice gas hydrodynamics in two and three dimensions", pages 77-135, Addison-Wesley, 1990).

An earlier model of cellular automaton was known as the "Logic CA" [unpublished]. The Logic CA has ties to previous work [e.g., John von Neumann, "Theory of Self-Reproducing Automata", University of Illinois Press, 1966], particularly if familiar with these types of constructions. A typical cellular automaton is an indefinite lattice (usually 2-dimensional) of "cells", each of which has a state variable that takes one of a finite number of values at every discrete time step (0, 1, 2, ...), and a transition function which takes as arguments the states of a cell's nearest neighbors and itself at some time step, and returns the state of that cell in the next time step. The number of neighbors is typically 4 or 8 in 2-dimensional cellular automaton, depending on the inclusion of diagonal neighbors.

The Logic CA consists of cells with 8 neighbors and 9 bits of state. The state bits are divided into 8 configuration bits and 1 dynamic state bit. The configuration bits are further divided into 2 gate bits that choose among the four allowed Boolean functions (AND, OR, XOR, NAND) and 6 input bits that choose among the 36 possible pairs of (potentially identical) inputs chosen from the 8 neighbors ($\frac{1}{2} \cdot 8 \cdot (8-1) + 8$). At each time step, a cell examines the dynamic state bit of its selected inputs, performs the selected Boolean operation on these inputs, and sets its own dynamic state to the result.

Mathematically, an instance of the Logic CA can be described as a series of global states $S_t$ ($t \in N_0$), each composed of local states $s_{t,(i,j)} \in \{0,1\}$ ($i,j \in Z$), and a set of constant configuration elements $$c_{(i,j)} \in C = (\{AND, OR, XOR, NAND\} \times (\{-1, 0, 1\}^2 - \{(0,0)\})^2)$$

$$= \{AND, OR, XOR, NAND\} \times$$

$$\left\{ \begin{matrix} (1,0), (1,1), (0,1), (-1,1), \\ (-1,-1), (0,-1), (1,-1) \end{matrix} \right\} \times$$

$$\left\{ \begin{matrix} (1,0), (1,1), (0,1), (-1,1), \\ (-1,0), (-1,-1), (0,-1), (1,-1) \end{matrix} \right\}$$

(note that there is a bijection between C and $\{0,1\}^8$, 8 bits) such that $$s_{t+1,i,j} = \begin{cases} \text{if } (c_{(i,j)})_1 = AND & s_{t,(i,j)+(c_{(i,j)})_2} \wedge s_{t,(i,j)+(c_{(i,j)})_3} \\ \text{if } (c_{(i,j)})_1 = OR & s_{t,(i,j)+(c_{(i,j)})_2} \vee s_{t,(i,j)+(c_{(i,j)})_3} \\ \text{if } (c_{(i,j)})_1 = XOR & s_{t,(i,j)+(c_{(i,j)})_2} \oplus s_{t,(i,j)+(c_{(i,j)})_3} \\ \text{if } (c_{(i,j)})_1 = NAND & \overline{s_{t,(i,j)+(c_{(i,j)})_2} \wedge s_{t,(i,j)+(c_{(i,j)})_3}} \end{cases}$$

FIG. 1 depicts Logic CA gates AND 110, OR 120, XOR 130, and NAND 140. In FIG. 1, pixels 150 indicate the selected input directions for a given cell, central glyphs 160, 165, 170, 175 indicates the selected Boolean functions, and the color of the glyph indicates the dynamic state (e.g. blue=0, red=1).

Although the Logic CA is useful for many applications, two major problems were identified with it: lack of reversible/adiabatic logic and the requirement for a global clock. The system does not employ conservative logic [Edward Fredkin and Tommaso Toffoli, "Conservative logic", International Journal of Theoretical Physics, 21(3):219-253, April 1982] or adiabatic computing [J. S. Denker, "A review of adiabatic computing", In Low Power Electronics, Digest of Technical Papers, IEEE Symposium, pages 94-97, 1994], which is necessary to truly represent physical resources. The clock is global, which is clearly a non-local effect, and cellular automata are not fundamentally required to have a global clock in order to perform universal computation [Kenichi Morita and Katsunobu Imai, "Logical Universality and Self-Reproduction in Reversible Cellular Automata", ICES '96: Proceedings of the First International Conference on Evolvable Systems, pages 152-166, London, UK, 1996, Springer-Verlag; Jia Lee, Ferdinand Peper, Susumu Adachi, Kenichi Morita, and Shinro Mashiko, "Reversible Computation in Asynchronous Cellular Automata", UMC '02: Proceedings of the Third International Conference on Unconventional Models of Computation, pages 220-229, London, UK, 2002, Springer-Verlag].

Another related sub-field is that of field-programmable gate arrays (FPGAs). Gate arrays have evolved over time from sum-product networks such as Shoup's [R. G. Shoup, "Programmable Cellular Logic Arrays", PhD thesis, Carnegie Mellon University, 1970] and other acyclic, memoryless structures such as Minnick's [R. C. Minnick, "Cutpoint Cellular Logic", IEEE Transactions on Electronic Computers, EC13(6):685-698, December 1964] to the complex, non-local constructions of today's commercial offerings, yet skipping over synchronous and sequential, but simplified local-effect cells.

The tradition of parallel programming languages, from Occam [A. W. Roscoe and C. A. R. Hoare, "The laws of Occam programming", Theoretical Computer Science, 60(2):177-229, September 1988] to Erlang [Joe Armstrong, Robert Virding, Claes Wikstrom, and Mike Williams, "Concurrent Programming in Erlang", Second Edition, Prentice-Hall, 1996] to Fortress [Guy L. Steele, Eric Allen, David Chase, Victor Luchangco, Jan-Willem Maessen, Sukyoung Ryu, and Sam Tobin-Hochstadt, "The Fortress Language Specification", Technical report, Sun Microsystems, March 2007] is also of interest. Although they are designed for clusters of standard machines (possibly with multiple processors sharing access to a single, separate memory), they introduce work distribution techniques and programming language ideas that are likely to prove useful in the practical application of the present invention.

The Connection Machine [W. Daniel Hillis, "The Connection Machine", MIT Press, Cambridge, Mass., 1985] was designed with a similar motivation—merging processing and memory into a homogeneous substrate—but as the name indicates, it also included many non-local connections ("In an abstract sense, the Connection Machine is a universal cellular automaton with an additional mechanism added for non-local communication. In other words, the Connection Machine hardware hides the details.") However, the implementation of Lisp on the Connection Machine [G. L. Steele and W. D. Hillis, "Connection Machine Lisp: fine-grained parallel symbolic processing", ACM Press, 1986] does introduces concepts such as xectors, which are likely to be useful in the implementation of functional programming languages in a cellular automaton-based architecture.

SUMMARY

A family of reconfigurable, charge-conserving asynchronous logic elements that interact with their nearest neighbors allows the design and implementation of circuits which are asynchronous at the bit level, rather than merely at the level of functional blocks. These elements pass information by means of charge packets (tokens), rather than voltages. Each cell is self-timed, and cells that are configured as interconnect perform at propagation delay speeds, so hardware non-local connections are not needed.

In one aspect, an asynchronous logic element is a cell having a set of four edges with neighboring cells, each containing zero or one tokens, thus comprising a bit of state. Each cell represents one logical operation, storage for its state, one unit of space, and one unit of time to transit. At each time step, a cell examines the dynamic state bit of its selected inputs, performs the selected Boolean operation on these inputs, and sets its own dynamic state to the result. Logical states are represented by tokens for 0 and 1, and gates pull and push tokens when their inputs are valid and outputs empty. Between each pair of cells, in each direction, there is a pair of edges, one to represent a "0" signal, and the other a "1" signal. Instead of each cell being configured to read the appropriate inputs, this data is now represented by an "active" bit in each edge. Then, each cell becomes a stateless node (except the gate type), which can fire on the conditions that all its active inputs are providing either a "0" token or a "1" token and that none of its active output edges is currently occupied by a token of either type. When firing, it consumes the input tokens, removing them from the input edges, performs its configured function, and deposits the result to the appropriate output edges.

BRIEF DESCRIPTION OF THE DRAWINGS

Other aspects, advantages and novel features of the invention will become more apparent from the following detailed description of the invention when considered in conjunction with the accompanying drawings wherein.

DETAILED DESCRIPTION

Figure 1:
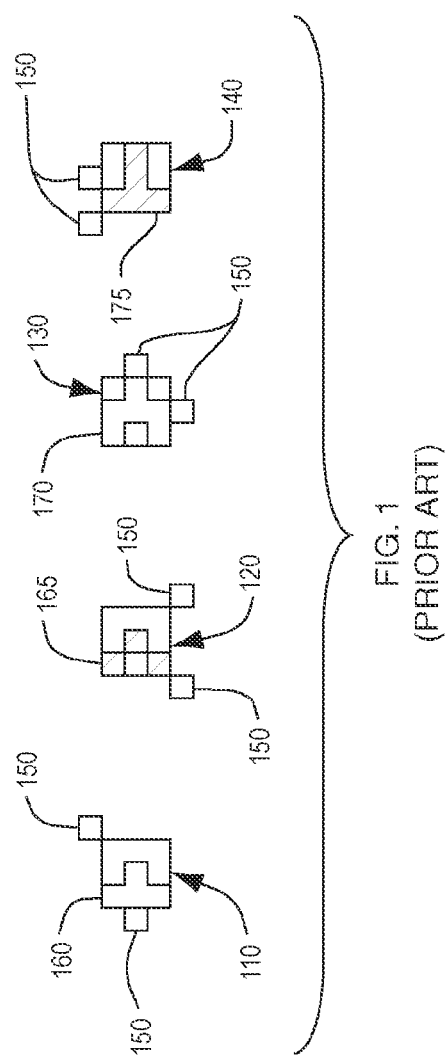
FIG. 1 depicts functional representations of four prior art Logic cellular automata.

A family of reconfigurable, charge-conserving asynchronous logic elements that interact with their nearest neighbors allows the design and implementation of circuits which are asynchronous at the bit level, rather than merely at the level of functional blocks (sometimes known as "globally asynchronous, locally synchronous" design). It handles in a natural, cheap way the resulting book-keeping overhead without special design consideration. These circuits pass information by means of charge packets (tokens), rather than voltages, thus conserving energy. Because each cell is self-timed, cells that are configured as interconnect perform at propagation delay speeds, so hardware non-local connections are not needed.

Asynchronous Logic Automata according to the present invention are based on the earlier model cellular automaton known as the Logic CA, but they solve the two identified major problems with it, lack of reversible/adiabatic logic and the requirement for a global clock. In the majority of cases, these asynchronous circuits consume less total power, dissipate proportionally less waste heat, and run more quickly than synchronous equivalents. They may solve any problems that can be solved with a computer, but scale far more readily due to their local-only connections, and will find practical applications in high-performance and/or scientific computing. They may also be considered as replacements for field-programmable gate array devices, having the same advantages in power, heat, and speed.

The present invention employs a new approach, inspired by lattice-gas theory [Tommaso Toffoli, Silvio Capobianco, and Patrizia Mentrasti, "When—and how—can a cellular automaton be rewritten as a lattice gas?", Theoretical Computer Science, Vol. 403, Issue 1, pages 71-88, 21 Aug. 2008] and Petri net theory [C. A. Petri, "Nets, time and space", Theoretical Computer Science, 153(1-2):3-48, January 1996]. A lattice gas is a model similar to cellular automata in which the cells communicate by means of particles with velocity as opposed to broadcasted states. Practically, this means that the information transmitted by a cell to each of its neighbors is independent in a lattice gas, where in a cellular automaton these transmissions are identical. By convention, a lattice gas also has certain symmetries and conservation properties that intuitively approximate an ideal gas [M. Henon, "On the relation between lattice gases and cellular automata", pages 160-161, World Scientific, 1989], and in some cases, numerically approximate an ideal gas [Uriel Frisch, Dominique d'Humieres, Brasl Hasslacher, Pierre Lallemand, Yves Pomeau, and Jean-Pierre Rivet, "Lattice gas hydrodynamics in two and three dimensions", pages 77-135, Addison-Wesley, 1990].

Petri nets are a broad and complex theory, but the present invention is primarily concerned with the subclass known as "marked graphs", a detailed explanation of which can be found in T. Murata, "State equation, controllability, and maximal matchings of petri nets", IEEE Transactions on Automatic Control, 22(3):412-416, 1977. A marked graph is a graph whose edges can be occupied at any given time by zero or more tokens. According to certain conditions on the tokens in edges neighboring a node of the graph, the node may be allowed to "fire" (at any time, as long as the conditions are met) by performing some operation on the tokens, such as moving a token from one of its edges to another or simply consuming a token from an edge).

Figure 2:
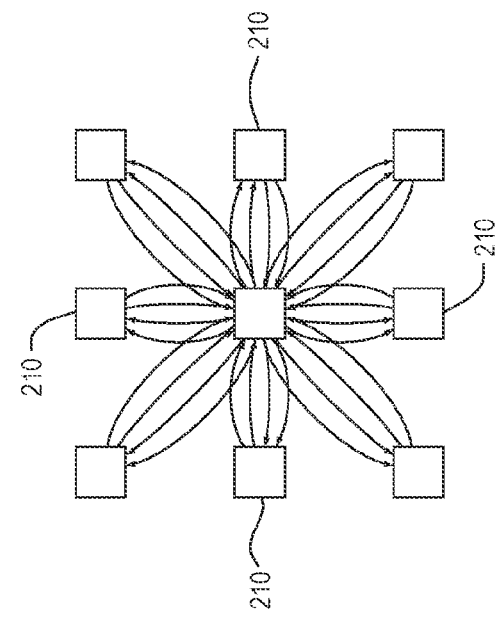
FIG. 2 depicts an exemplary conceptual embodiment of an Asynchronous Logic Automata cell, according to one aspect of the present invention.

The present invention merges these with the existing Logic CA, as follows. The global clock and the bit of dynamic state in each cell are removed, and the neighborhood broadcasts are replaced with a set of four edges between neighboring cells, each containing zero or one tokens, thus comprising a bit of state. FIG. 2 depicts a single Asynchronous Logic Automata cell 205 and its neighbors 210, according to one aspect of the present invention. Logical states are represented by tokens for 0 and 1, and gates pull and push tokens when their inputs are valid and outputs empty. Between each pair of cells, in each direction, there is a pair of edges, one to represent a "0" signal, and the other a "1" signal. Each pair of edges could be considered one edge which can carry a "0" token or a "1" token. Instead of each cell being configured to read the appropriate inputs, this data is now represented by an "active" bit in each edge. Then, each cell becomes a stateless node (except the gate type), which can fire on the conditions that all its active inputs are providing either a "0" token or a "1" token and that none of its active output edges is currently occupied by a token of either type. When firing, it consumes the input tokens, removing them from the input edges, performs its configured function, and deposits the result to the appropriate output edges. As it is a marked graph, the behavior of this model is well-defined, even without any assumptions regarding the timing of the computations, except that each computation will fire in some finite length of time after the preconditions are met.

Figure 3A:
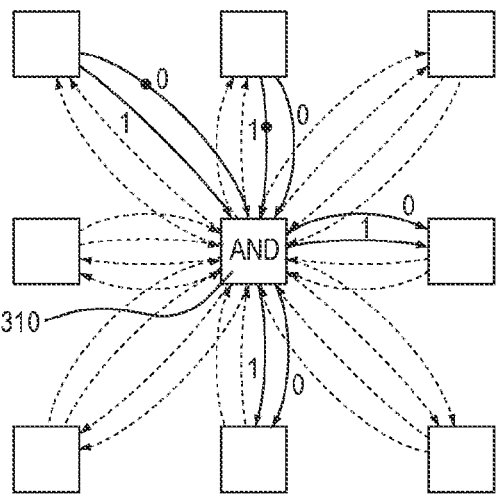
FIGS. 3A-C present an exemplary embodiment of a 2-input, 2-output AND gate as it is firing, according to one aspect of the present invention.
Figure 3B:
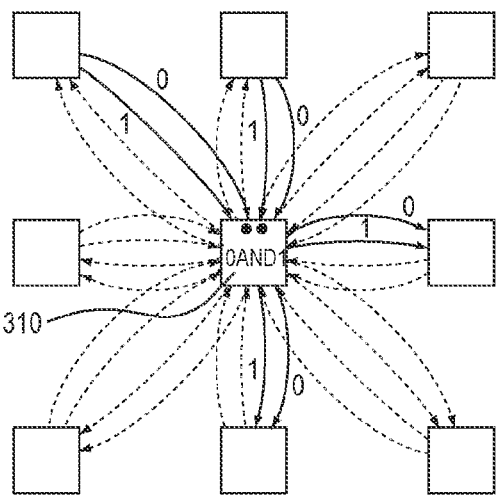
Figure 3C:
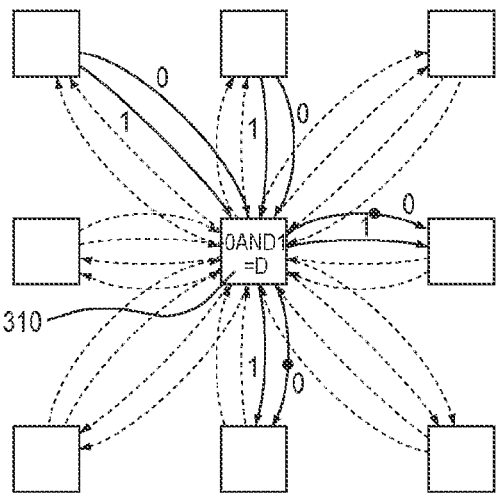

FIG. 3A-C depict the firing of an exemplary embodiment of a 2-input, 2-output AND 310 gate. Despite the loss of information, tokens are conserved in this example. In FIG. 3A, the firing conditions met. In FIG. 3B, inputs are collected and computation performed, and in FIG. 3C, the result is distributed.

The model of the present invention operates asynchronously, and removes not only the need for a global clock, but also the need for any clock at all. It also introduces explicit accounting for the creation and destruction of tokens, which make up the majority of the energy consumption and power dissipation (respectively) of a well-designed device implementing the model. For instance, in FIGS. 3A-C, since there are two inputs and two outputs, no tokens need be created or destroyed. While the model still uses the same irreversible Boolean functions, these functions can be thought of as being simulated by conservative logic that is taking in constants and dispersing garbage [Edward Fredkin and Tommaso Toffoli, "Conservative logic. International Journal of Theoretical Physics", 21(3):219-253, April 1982], enabling easy "pricing" of the cost of non-conservatism in any given configuration. In addition, this model adapts much more easily to take advantage of adiabatic logic design; for instance, when a cell is being used to ferry tokens from one place to another, if it is identified by the software configuration as a wire, it can apply only the minimal energy needed for state restoration using a non-linear gain instead of a traditional, charge-dumping CMOS stage.

Figure 4A:
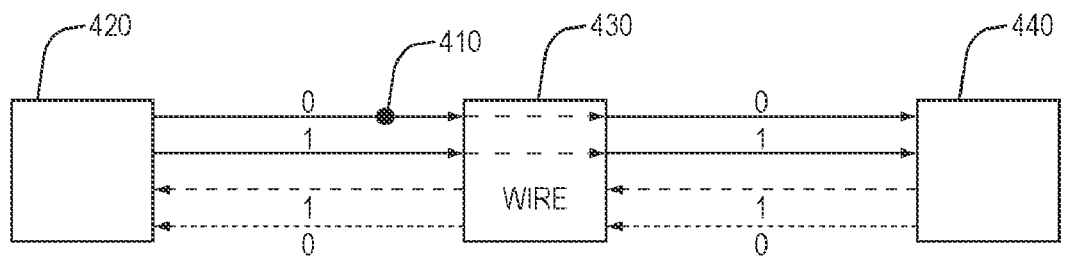
FIGS. 4A-C depict the progress of a bit travelling left to right through an exemplary embodiment of a wire cell, according to one aspect of the present invention.
Figure 4B:
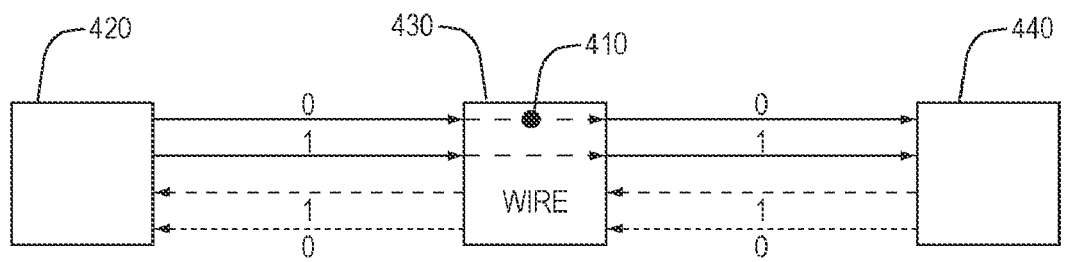
Figure 4C:
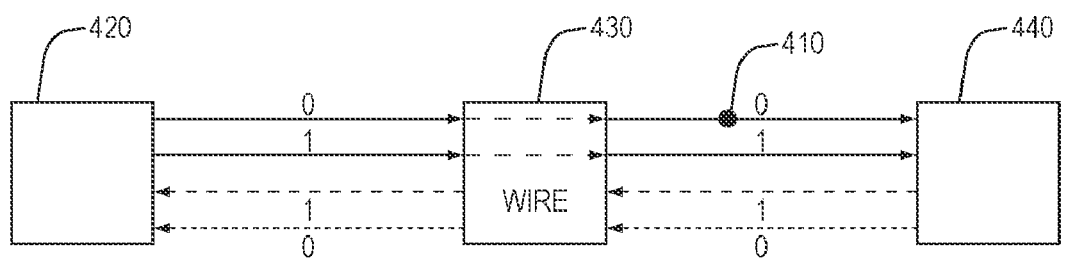

FIGS. 4A-C depict the progress of a bit travelling left to right through an exemplary embodiment of a wire cell. In FIG. 4A, token 410 is output by left cell 420. In FIG. 4B, token 410 passes through wire cell 430, and in FIG. 4C, token 410 now passes to right cell 440.

Figure 5:
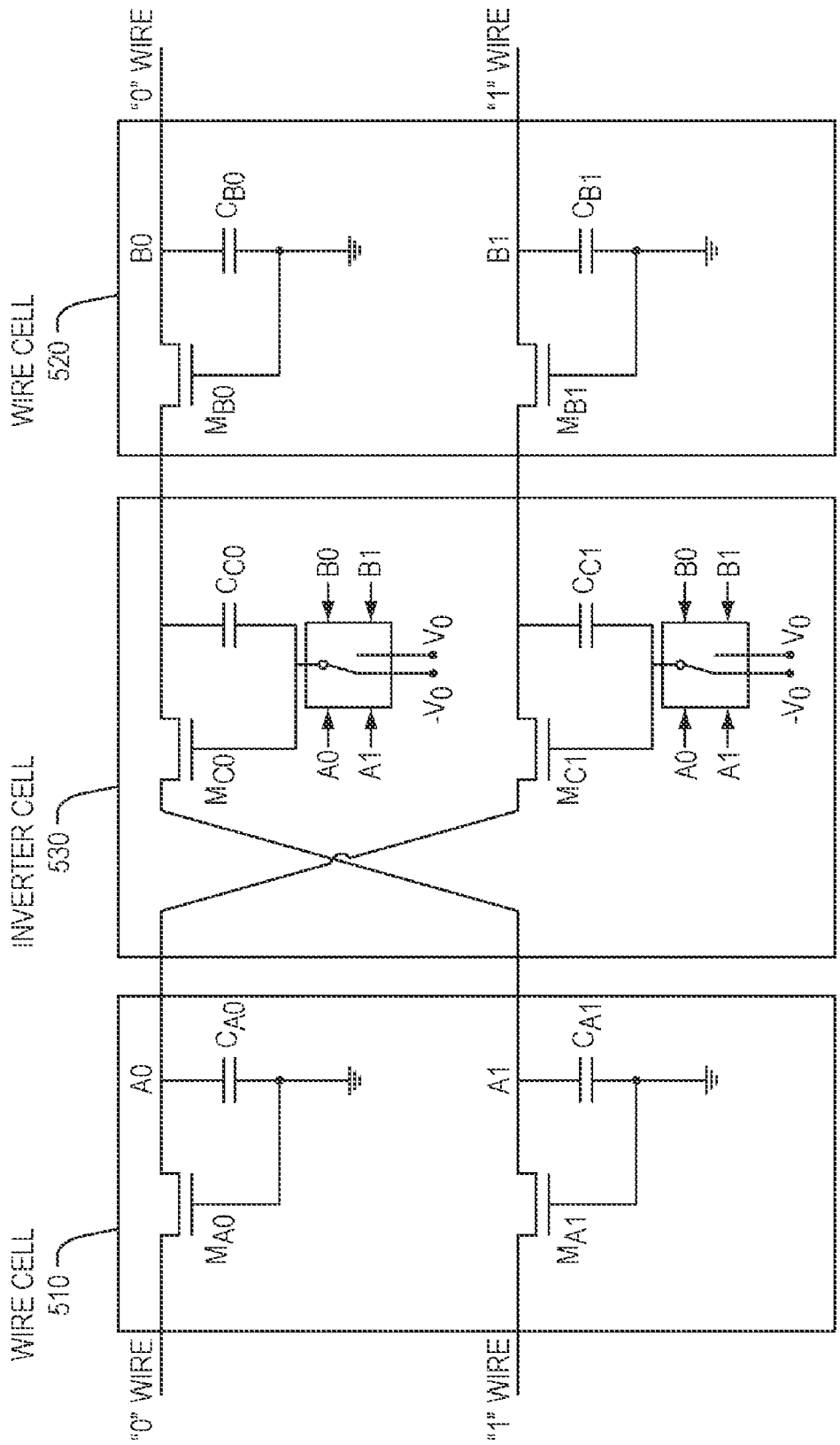
FIG. 5 is a schematic showing the transistor-level equivalent of an exemplary embodiment of configured wire and inverter cells, according to one aspect of the present invention.
Figure 6:
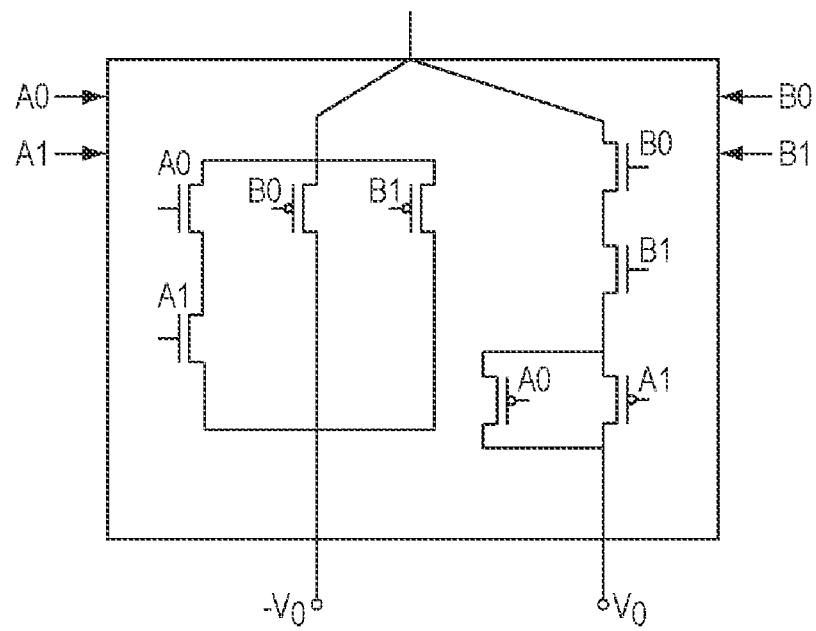
FIG. 6 is an expansion of the "switch" block from FIG. 5.

FIGS. 5 and 6 depict the general concept of how cells according to the present invention may be implemented using so-called "bucket brigade", or charge-domain, logic. FIG. 5 is a schematic showing the transistor-level equivalent of an exemplary embodiment of configured wire 510, 520 and inverter 530 cells, according to one aspect of the present invention. FIG. 6 is an expansion of "switch" block from FIG. 5.

It will be clear to one of skill in the art that there are many possible Asynchronous Logic Automata variations, including, but not limited to: (1) No Diagonals, wherein connections may only be present between vertically or horizontally adjacent cells, in order to simplify circuit layout; (2) Multiple signals, wherein more than four token-storing edges may connect neighboring cells, allowing the conveyance of more parallel information in the same period of time; and (3) More functions, wherein the class of possible functions executed by each cell need not be limited to {AND, OR, XOR, NAND}, but may include any function f: $\{0, 1, \emptyset\}^n \to \{0, 1, \emptyset\}^n$, where n is the number of neighbors of each cell (for n=8, there are 43,046,721 possible functions). A cell executing function f may fire if f's present output is not $\emptyset^n$ and every non-empty element of the output points to either an inactive or empty set of output edges. Then each of those output edges would become populated with the value specified by f's output. There is a tradeoff between the number of functions allowed and the number of configuration bits in each cell needed to specify the function.

One key element of the present invention that is not present in any of the prior art models is that of formal conformance to physics: classical cellular automata are an "overshoot", imposing too many constraints between space and time above those of physics; gate arrays have become non-local and are trending further away from local interactions; practical parallel languages accept the architecture of commercial computers and simply make the best of it in software; and the Connection Machine allows non-local communication by hiding physical details. Also, at least as important is the fact that the model operates precisely without a global clock, while the prior art models do not. This decreases power requirements and heat dissipation, while increasing overall speed.

Without long-range wires it is not possible to provide the instantaneous global clock assumed by a cellular automata model. There are asynchronous cellular automata, in which cells update at random times [Computation by Asynchronously Updating Cellular Automata, S. Adachi, F. Peper, and J. Lee, Journal of Statistical Physics (114), pp. 261-289 (2004)], however these require many cellular automata cells to implement a logic gate in order to provide delay insensitivity. Just as logic automata use a logic operation as the primitive element, an Asynchronous Logic Automata [Asynchronous Logic Automata, D. A. Dalrymple, N. Gershenfeld, and K. Chen, Proceedings of AUTOMATA 2008, pp. 313-322 (2008)] provides consistent asynchronous operation in each cell by implementing a nearest-neighbor Petri net [Nets, Time and Space, C. A. Petri, Theoretical Computer Science (153), pp. 3-48 (1996)].

Figure 7:
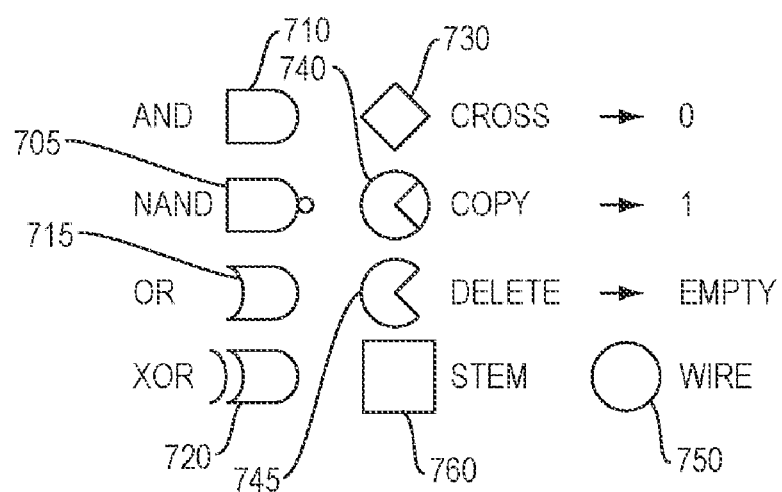
FIG. 7 is a chart functionally depicting the available Asynchronous Logic Automata cell types, according to one aspect of the present invention.

FIG. 7 is a chart functionally depicting the available Asynchronous Logic Automata cell types, according to one aspect of the present invention. In the current Asynchronous Logic Automata implementation, there are 4 logic cell types: NAND 705, AND 710, OR 715, and XOR 720. NAND 705 is actually universal, with the others being included in order to simplify logic design. Crossover cell 730 allows tokens to cross. Copy 740 and delete 745 cells have a data input, marked by a triangle, and a control input; when the control is 0, the data token passes the gate, and when it is 1, the data token is either deleted or copied. Each of these two-input gates is deterministic, so that their operation is independent of the evaluation order in an Asynchronous Logic Automata circuit. They are connected by wires 750 between nearest neighbors (rectangular in 2D or 3D) that can store a token or be empty, and for clarity AND 710 or OR 715 gates with duplicated inputs (used for logical wiring) are drawn as circles. "Stem" cell 760 provides the option of reconfigurability.

Figure 8:
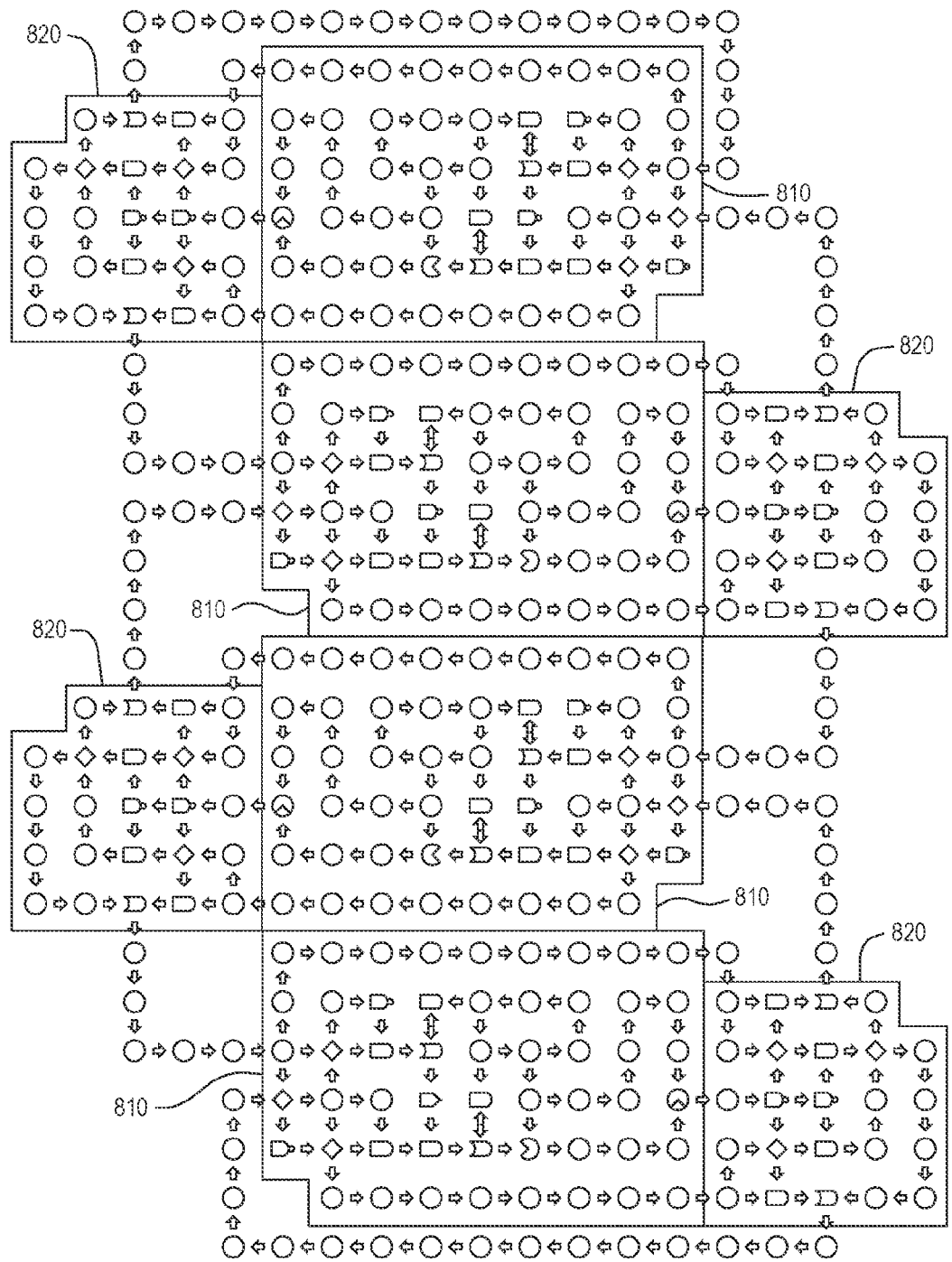
FIG. 8 depicts a portion of an Asynchronous Logic Automata sorting implementation that interleaves comparator and switching blocks, according to one aspect of the present invention.

FIG. 8 depicts a portion of an exemplary embodiment of an Asynchronous Logic Automata sorting circuit, interleaving comparator 810 and switching 820 blocks. It has the structure of an odd-even transposition sort, implementing a parallel bubble sort. The circuit size is linear in the numbers to be sorted, and the execution time is linear because that constitutes the worst-case time for a number to travel from one end to the other. FIG. 8: Linear-time asynchronous logic automata sorting circuit, interleaving comparators and switchers.

The circuit of FIG. 8 illustrates an essential Asynchronous Logic Automata characteristic: time, state, space, and logic scale equivalently. Each cell represents one logical operation, storage for its state, one unit of space, and one unit of time to transit. Here the cost of a computation is counted not in the number of operations, but in the distance that information travels. Sorting becomes $O(N)$ instead of $O(N \log N)$ or $O(N^2)$ because the number of parallel operations is proportional to the number of numbers stored. This kind of speed-up is a benefit of using special-purpose array processors [VLSI Array Processors, S. Y. Kung, IEEE ASSP Magazine, pp. 4-22 (July 1985)], but is available here in general-purpose universal computation.

In CMOS, the asynchronous operation of Asynchronous Logic Automata can be realized by handshaking based on logic levels [Modeling and Comparing CMOS Implementations of the C-Element, M. Shams, J. C. Ebergen, M. I. Elmasry, IEEE Transactions on Very Large Scale Integration (VLSI) Systems (6), pp. 563-567 (1998)], or by directly sensing a token's charge packet. A cell can be implemented with roughly one hundred transistors [F. Green, K. Chen, A. Knaian, N. Gershenfeld, Asynchronous Logic Automata IC Design, manuscript (2009)]. If that many memory locations are associated with a cell processor, speed can be traded-off for density by virtualization to reduce the overhead for Asynchronous Logic Automata over RAM to on the order of a transistor per bit.

Familiar benefits of asynchronous logic include speed (operating at the local gate propagation delay rather than a global clock cycle) and power (which, other than leakage, is consumed only where transitions happen), however asynchronous circuits have been notoriously difficult to design [Asynchronous Design Methodologies: An Overview, Scott Hauck, Proceedings of the IEEE (83), pp. 69-93 (1995)]. This is simplified by the use of a dataflow language, but that representation must still be mapped onto the elements of an asynchronous array [Reconfigurable Asynchronous Logic, R. Manohar, Proceedings of the IEEE Custom Integrated Circuits Conference, pp. 13-20 (2006)]. In Asynchronous Logic Automata, because each gate is an asynchronous processor, asynchrony becomes implicit, a description of the logical relationships in a circuit implies their asynchronous ordering.

Anyone who can design Asynchronous Logic Automata can design an IC, because of the equivalence of each logical cell and its circuit implementation. Due to this locality, there are no global design rules to account for. FPGAs also allow logical circuits to be realized in physical circuits; however, the former must be fit to the available logic blocks and switch matrices of the latter [Fitting Programmable Logic, T. R. Clark, IEEE Spectrum (29), pp. 36-39 (1992)]. Asynchronous Logic Automata are translationally invariant; they can be understood as a limiting case of an (asynchronous) FPGA, in which the logic blocks are single gates and the switch matrices connect nearest neighbors. Unlike a conventional FPGA, this means that two Asynchronous Logic Automata chips are equivalent to one Asynchronous Logic Automata chip of twice the size—the interconnect serves the same function within and between chips. Asynchronous Logic Automata can also be viewed as a limiting case of a RISC processor (where instructions are reduced to a single logical operation), and of a multicore processor (in which every bit becomes a core).

Because the Asynchronous Logic Automata description captures the essential features of time, space, state, and logic, it is portable across implementations: any process technology that can provide the local cell updates will work the same globally. Logic automata can be generalized to other logic representations, including real-valued analog logic states for capturing probabilistic information [Analog Logic Automata, K. Chen, L. Leu, L. and N. Gershenfeld, Proceedings of the IEEE Biomedical Circuits and Systems Conference (BioCAS), pp. 189-192 (2008)], and quantum states.

Asynchronous Logic Automata does assume a regular lattice. Although it is possible to compute with randomly distributed processors [Programming a Paintable Computer, W. J. Butera, Ph.D. Thesis, MIT (2002)], there are promising techniques (including self-assembly and soft lithography) for volume production of regular micro- and nano-structures. They have been limited by global defects and lithographic complexity, but Asynchronous Logic Automata fabrication requires only enough local order to produce a cell. Because the Asynchronous Logic Automata cell size is so much smaller than a VLSI chip, they can use much more aggressive processes for the same yield. Cell errors that do occur can be accommodated with error correction codes applied spatially rather than temporally.

There have been special-purpose cellular automata computers [T. Toffoli, N. Margolus, "Cellular Automata Machines: a New Environment for Modeling", MIT Press, Cambridge, Mass., 1987]; however, the form factor of the computer did not match that of the computation. Logic automata can be used in scalable "conformal" computing architectures that can cover surfaces and fill volumes, and be incrementally extended to match workloads. An example is the wallpaper computing display discussed in M. Pavicic, "Wallpaper Computers: Thin, Flexible, Extensible, and R2R Ready", Proceedings of the Flexible Electronics & Displays Conference, 2009. Here, the logic automata are locally emulated in commodity (~$1) microcontrollers (AVR), which can be assembled in a "roll-to-place" process in sheets, with output cells being mapped onto an associated array of LEDs (other emissive or reflective media could be used, although in volume LEDs approach a penny per pixel). Unlike existing displays, there is not a separate I/O processor, raster image processor, and frame buffer; those functions are distributed. The display size and shape is arbitrary, input and output can be done anywhere, and relevant computations can be programmably integrated into the display, such as graphical rendering, data-driven inference, or cryptographic decoding. The same architecture could be applied to programming extensible arrays of sensors or actuators, power electronics, and processors for high-performance computing.

Mathematical Programming of Global Goals. An Asynchronous Logic Automata circuit is like a universal, portable, spatial microcode. This kind of low-level description provides explicit control over every cell, but is too detailed for higher-level goals. The sorting circuit in FIG. 8 was designed with a Verilog-like language; Table 1 presents a fragment:

TABLE 1

```
c2 = comparator(c1.x+c1.dx−1,c1.y+c1.dy,flip='x')
s2 = switcher(c2.x−c2.dx,c2.y,flip='x')
wire([1,1,0,1,'x'],
    s1.cell['out1'],
    gate('wire','',s1.cell['out1'].x,c2.cell['in0'].y),
    c2.cell['in0'])
wire([0,0,0,0,'x'],
    s2.cell['out0'],
    gate('wire','',s2.cell['out0'].x,c1.cell['in1'].y),
    c1.cell['in1'])
``` and Table 2 presents a fragment of the definition of the comparator that it calls:

TABLE 2

```

# upper 10 detector

gate('wire','wxsx',1,3)
gate('wire','sx',1,4)
gate('and','wxnx',2,3)
gate('nand','wx',2,4)

# upper latch

gate('or','wxn0',3,3)
gate('and','sxex',3,4)
```

This is similar to how ICs are designed, with the difference being that naming a function and placing a part are equivalent, since they are defined spatially. It could be implemented graphically as well as textually, as a CAD-like visual dataflow language for which the picture is the program rather than a representation of one to be executed by a scheduler.

One way to use an existing programming language would be to implement an Asynchronous Logic Automata version of a processor that can execute it; however, this would constrain the Asynchronous Logic Automata scalability by that processor's design assumptions. A more direct mapping is to use the program listing itself as the executable, building Asynchronous Logic Automata equivalents to the operations performed by each line of code. This removes the processor dependency, but retains the assumptions of the programming language, and the requirement of an explicit procedural specification of the steps to solve a problem.

Constraint programming languages are based on specifying goals and constraints [J. F. Puget and I. J. Lustig, "Program Does Not Equal Program: Constraint Programming and Its Relationship to Mathematical Programming", Interface (31), pp. 29-53 (2001)]; however, their use has been limited by the necessity of supplying a solver for the program. In physical systems, there can be an equivalence between local and global descriptions arising from symmetries and conservation laws [Classical Mechanics, H. Goldstein, C. Poole, and J. L. Safko, Addison Wesley (Reading, Mass., 2002). The dynamics of an electrical network can be understood as locally solving Maxwell's equations or globally solving a mathematical program [Mathematical Programming and Electrical Networks, J. B. Dennis, MIT Press (Cambridge, Mass., 1959]. There is no corresponding notion in computer science, because current computers lack symmetries and conservation laws, but the evolution of the states on an Asynchronous Logic Automata lattice can be treated as a discrete dynamical system Returning to the sorting example from FIG. 8, given an unsorted list of numbers $\vec{u}$ the goal can be written as seeking a permutation matrix P that arranges $\vec{u}$ into a sorted list $\vec{s}$:

$$\vec{s} = P\vec{u} \tag{1}$$

where $$P_{ij} = \{0,1\} \tag{2}$$

and $$\Sigma_i P_{ij} = \Sigma_j P_{ij} = 1. \tag{3}$$

One way to define the sort is by maximizing $$\max_P f = \max_P \sum_i i s_i = \max_P \sum_i i \sum_j P_{ij} u_j. \tag{4}$$

$f$ is maximum if the largest indices are multiplied by the largest sorted numbers.

Equation (4) is a combinatorial optimization, but the integral constraint can be relaxed to $$0 \leq P_{ij} \leq 1 \tag{5}$$

because the Birkhoff-von Neumann theorem guarantees that the extrema will be at a vertex of the polytope defined by the relaxed $P$. This gives the linear program $$\max_P \sum_i i \sum_k P_{ij} u_j = \max_P \vec{i}^T P \vec{u} \tag{6}$$

subject to $$\sum_i P_{ij} \sum_j P_{ij} = 1,$$

$$0 \leq P_{ij} \leq 1,$$

where $P$ is now a doubly stochastic matrix.

Consider the $2\times 2$ case $$f = [1\ 2]\begin{bmatrix} P_{11} & P_{12} \\ P_{21} & P_{22} \end{bmatrix}\begin{bmatrix} u_1 \\ u_2 \end{bmatrix}. \tag{7}$$

The normalization constraint can be imposed by writing the permutation matrix as $$f = [1\ 2]\begin{bmatrix} P & 1-P \\ 1-P & P \end{bmatrix}\begin{bmatrix} u_1 \\ u_2 \end{bmatrix}, \tag{8}$$

which has a gradient equal to the difference of the unsorted variables $$\frac{\partial f}{\partial P} = u_2 - u_1. \quad (9)$$

The integral constraint can be included in a Lagrangian $$L = f(P) - \lambda P(1-P) \quad (10)$$

Setting the derivative of this with respect to $P$ to 0 gives $$\lambda = \frac{u_2 - u_1}{1 - 2P} \quad (11)$$

The Lagrange multiplier is equal to the gradient, with a sign set by the permutation matrix.

In terms of this 2×2 solution, the sorting circuit in FIG. 8 can be understood equivalently as a dual decomposition in which the comparators update the Lagrange multipliers and the switchers update the primal variables, as a feasible gradient descent with the comparators taking local gradients and the switchers make gradient steps, or as a factorization of the permutation matrix intro a product of odd-even swaps.

Common to all of these interpretations is the equivalence of their symbolic and spatial representations. The elements of the vector $$\begin{bmatrix} u_1 \\ \vdots \\ u_N \end{bmatrix}$$

correspond to axes in $\mathcal{R}^N$, but they also have a two-dimensional position on this printed page. The latter coordinates correspond to their location in the Asynchronous Logic Automata array, and their evolution to the spatial flow of variables through the mathematical expressions that manipulate them.

In such a system, the algorithm order equals the distance that information travels. One consequence of this is that arithmetic operations require a time that is linear in the length of a bit string, unlike the $O(N^2)$ needed for a naive algorithm and $O(N \log N)$ for a transform-based approach [Numerical Methods in Asynchronous Logic Automata, S. Greenwald, L. Molinero, and N. Gershenfeld, manuscript (2009)]. This speeds up floating-point math, and can be applied in fixed-point math that doesn't require roundoff. Roughly 1000 bits would be required to match the dynamic range of a double-precision floating-point number; propagating bits at picoseconds per cell would correspond to nanoseconds per mathematical operation. Multiplying matrices can also be done in an Asynchronous Logic Automata in a time that is linear in the size of the matrices, because the worst-case distance is an element that must transit a complete row and column. With linear-time matrix math, fast transforms and sparse algorithms are no longer needed for speed—they require the same time to multiply with an Asynchronous Logic Automata.

The present invention is primarily concerned with exposing the details, so that the programmer can decide on resource trade-offs dynamically. This model is a new means to compute efficiently and swiftly, and may be especially useful initially in high-performance computing. Concepts such as the xectors introduced in the implementation of Lisp on the Connection Machine [G. L. Steele and W. D. Hillis, "Connection Machine Lisp: fine-grained parallel symbolic processing", ACM Press, 1986], are likely to be useful in the implementation of functional programming languages in the present invention. The present invention may be implemented as digital Asynchronous Logic Automata, but may also be advantageously implemented as Analog Logic Automata. Analog Logic Automata are further described in co-pending U.S. patent application Ser. No. 12/422,491, "Analog Logic Automata", filed Apr. 13, 2009, the entire disclosure of which is herein incorporated by reference.

Related patents include U.S. Pat. No. 4,068,214, from which the present invention is distinguished by local-only connections, by computing in the array rather than the edges, and by charge-conservation; U.S. Pat. No. 4,464,726, from which the present invention is distinguished by the capacity to perform any boolean function and/or by programmability in each cell; U.S. Pat. No. 4,700,187, from which the present invention is distinguished by a relative simplicity of cells and by charge-conservation; and U.S. Pat. No. 5,243,238, from which the present invention is distinguished by asynchrony, by local-only connections, and by charge-conservation.

While a preferred embodiment is disclosed, many other implementations will occur to one of ordinary skill in the art and are all within the scope of the invention. Each of the various embodiments described above may be combined with other described embodiments in order to provide multiple features. Furthermore, while the foregoing describes a number of separate embodiments of the apparatus and method of the present invention, what has been described herein is merely illustrative of the application of the principles of the present invention. Other arrangements, methods, modifications, and substitutions by one of ordinary skill in the art are therefore also considered to be within the scope of the present invention, which is not to be limited except by the claims that follow.

What is claimed is:

1. An asynchronous logic element, comprising:
a plurality of edges providing bit-level asynchronous communication with at least one contiguously neighboring logic element, each edge comprising:
at least one input for receiving at least one input logic state token from a contiguously neighboring logic element; and
at least one output for transferring an output logic state token to a contiguously neighboring logic element; and
computational circuitry configured to perform a logic operation utilizing at least one received input logic state token as at least one input to produce an output logic state token reflecting the result of the logic operation, wherein the computational circuitry is neither globally or locally clocked, and wherein the input and output logic state tokens are implemented as charge packets and the charge packets are conserved during the logic operation.

2. The logic element of claim 1, further comprising storage circuitry for storing a logic element current state.

3. The logic element of claim 1, wherein the logic element is configured as a logic token transport element.

4. The logic element of claim 1, wherein the logic element is configured as a copy element.

5. The logic element of claim 1, wherein the logic element is configured as a delete element.

6. The logic element of claim 1, wherein the logic operation is an AND, NAND, OR, or XOR.

7. An asynchronous logic automata array, comprising:
a plurality of asynchronous logic automata elements, each element comprising:
   a plurality of edges providing bit-level asynchronous communication with at least one contiguously neighboring logic element, each edge comprising:
      at least one input for receiving at least one input logic state token from a contiguously neighboring logic element; and
      at least one output for transferring an output logic state token to a contiguously neighboring logic element; and
   computational circuitry configured to perform a logic operation utilizing at least one received input logic state token as at least one input to produce an output logic state token reflecting the result of the logic operation, wherein the computational circuitry is neither globally or locally clocked, and wherein the input and output logic state tokens are implemented as charge packets and the charge packets are conserved during the logic operation.

8. The array of claim 7, wherein the array is configured to implement at least one logical computation.

9. The array of claim 8, wherein the logical computation performed by the array is programmable.

10. The array of claim 7, wherein the array is configured to implement a sorting circuit.

11. The array of claim 10, wherein the sorting circuit comprises a plurality of arrays configured as comparators and switchers.

12. The array of claim 7, wherein the array is configured to implement a comparator.

13. The array of claim 7, wherein the array is configured to implement a switcher.

* * * * *